Oct. 13, 1964  G. K. NEWELL  3,152,524
BRAKE CYLINDER
Filed Aug. 31, 1962  2 Sheets-Sheet 1

INVENTOR.
GEORGE K. NEWELL
BY Joseph Janusekiewicz
ATTORNEY

INVENTOR.
GEORGE K. NEWELL
BY Joseph Januszkiewicz
ATTORNEY

United States Patent Office 3,152,524
Patented Oct. 13, 1964

3,152,524
BRAKE CYLINDER
George K. Newell, Penn Township, Westmoreland County, Pa., assignor to Westinghouse Air Brake Company, Wilmerding, Pa., a corporation of Pennsylvania
Filed Aug. 31, 1962, Ser. No. 220,781
1 Claim. (Cl. 92—255)

This invention relates to a fluid pressure brake cylinder assembly and more particularly to a rod and piston head assembly for a fluid pressure brake cylinder.

In brake cyinder piston assemblies, it is important to provide a piston rod and piston head assembly which facilitates easy assembly and disassembly, yet assures the non-leakage of the pressurized medium through the parts. In the more recent constructions in the piston rod and head assembly wherein a one-piece packing cup is frictionally held by the forward portion of the assembly, it is necessary to employ a machine press to bear against the push rod end to compress the sealing rubber cushion and position the related parts, such as the push rod, keeper and hollow piston rod into a definite position, to align respective holes therebetween to enable the insertion of retaining pins for holding the keeper and rods in place and maintain the sealing cushion in compression for sealing the related parts, after which it is further necessary to position a pin retaining sleeve over the related parts for retaining the sleeve in place. This form of construction is costly and requires the operation of assembly and disassembly to be done in a shop where a machine press is available for compressing the sealing cushion before the retaining pins are located.

It is an object of this invention to provide a novel piston rod and head assembly with a sealing arrangement therebetween using a minimum number of parts to reduce costs, yet assuring positive sealing engagement therebetween with the advantage that the operation may be done with ease in the shop as well as in the field upon the railway right-of-way with small portable tools.

Accordingly, the improved brake cylinder piston construction utilizes a piston rod with an enlarged end portion which receives an annular rubber seal for wedging engagement with a tapering shoulder on a piston head, such that a screw-type plug effectively connects the piston rod and piston head while simultaneously forcing sealing engagement between the piston rod and the shoulder on the piston head at the annular rubber seal.

A modification of the above assembly provides a piston rod having an enlarged end portion on which is seated an annular rubber seal which is wedgingly engaged by a tapering shoulder on an annular keeper sleeve. The annular keeper sleeve has a shoulder on its outer periphery for abutting engagement by an annular piston head. To connect the piston rod, sleeve and piston head, a threaded plug is rotatably mounted on the piston head and threadedly connected to the sleeve while bearing against the piston rod for forcing the piston rod into sealing engagement with the sleeve through the annular rubber seal, with lock means interconnecting the plug and piston head to prevent relative movement therebetween.

Other objects and advantages of the invention will become more apparent from the following more detailed description of the invention.

Figure 1:
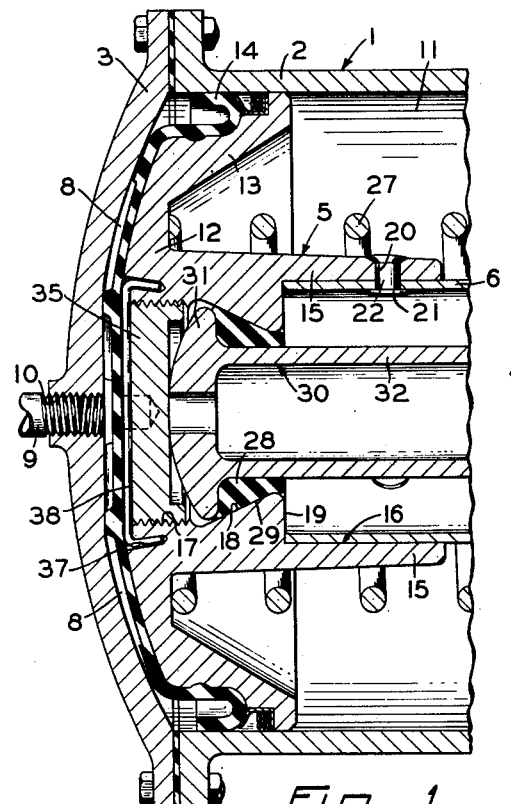
FIG. 1 is a side elevational, cross-sectional view of a portion of a brake cylinder piston assembly showing the piston rod and piston head located in the forward portion of the brake cylinder.
Figure 6:
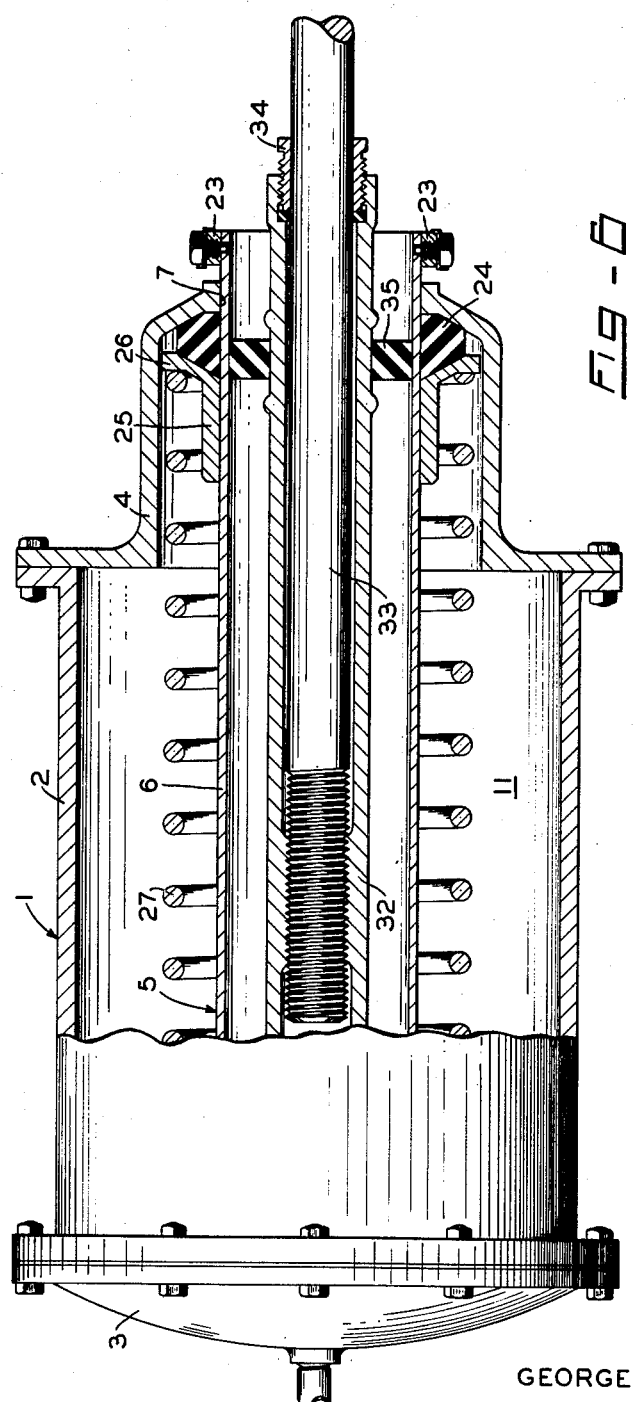
FIG. 6 is a side elevational view, partly in section, of a railway vehicle brake cylinder showing the hollow piston rod and stem relative to the brake cylinder body.

Referring to the drawings, FIGS. 1 and 6 disclose a fluid brake cylinder device 1 comprising a hollow cylindrical body 2 having a forwardly disposed circular pressure head 3 suitably secured to one end thereof and a rearwardly disposed non-pressure head 4 suitably secured to the other end thereof. Slidably mounted within the cylindrical body 2 is a piston assemblage 5 having a hollow piston rod 6 extending coaxially through a central aperture 7 in the non-pressure head 4.

A pressure chamber 8 is thus formed within brake cylinder device 1 between the pressure head 3 and the piston assemblage 5 to which chamber 8 fluid under pressure may be supplied through an inlet conduit 9 suitably threadedly connected to a threaded bore 10 in the central portion of the pressure head 3. The inlet conduit 9 may be connected to the brake control valve of the usual air brake system on railway vehicles. A non-pressure chamber 11 is formed within brake cylinder device 1 between the non-pressure head 4 and the piston assemblage 5.

Piston assemblage 5 comprises a forwardly disposed annular piston head 12 having a laterally outwardly extending flanged portion 13, which receives a packing cup 14. Reference is made to Patent No. 2,055,104 for a detailed description of the packaging cup 14. The forward portion of the packing cup 14 has a plurality of circumferentially spaced ribs which limit the forward movement of the piston assemblage 5 in the cylindrical body 2, such that the ribs serve as stop means and engage the circular pressure head 3. The annular piston head 12 has a collar 15 extending rearwardly from the forward portion thereof. A stepped bore 16 extends centrally through the annular piston head 12, having a forward portion suitably threaded as at 17 to receive a cylindrical plug to be described. Piston assemblage 5 has extending rearwardly from the rear portion of the threaded bore 17 and inwardly towards the longitudinal center line of the bore 16 an annular tapering wedging portion which presents an annular wedging surface indicated generally at 18 for a purpose to be described. The rearwardmost portion of stepped bore 16 has an enlarged diameter bore portion thereby providing a thin walled section on the rearwardly extending collar 15 whose cross-sectional area is smaller than the cross-sectional area of the intermediate portion of collar 15 such as to define an annular shoulder 19, which shoulder 19 is immediately adjacent but rearwardly of the annular wedging surface 18 on the collar 15. Collar 15 has a plurality of circumferentially spaced bores 20 extending radially therethrough for a purpose to be described.

The hollow piston rod 6 having an outside diameter substantially equal to the inside diameter of the rearward portion of collar 15 is frictionally held within the collar 15, with the one edge portion thereof abuttingly engaging the shoulder 19 on the collar 15. Hollow piston rod 6 has a plurality of circumferentially spaced bores 21 extending therethrough substantially in alignment with the circumferentially spaced bores 20 on the collar 15 such that rivets 22 extending through the respective bores 20 and 21 suitably rigidly connect the hollow piston rod 6 to the collar 15. The rearward portion of the hollow piston rod 6 has a ring 23 located exteriorly of the non-pressure head 4 for limiting the inward movement of the piston rod 6 relative to the brake cylinder device 1 when the pressure head 3 is removed for disassembly. Located within the brake cylinder device 1 in engagement with the rear inner wall surface of non-pressure head 4 is an annular packing ring 24 whose inner peripheral surface slidably engages the outer wall surface of the hollow piston rod 6 to prevent the entrance of dirt into the non-pressure chamber 11. Abuttingly engaging packing ring 24 is an annular retainer ring 25 having an outwardly extending flange portion 26 which provides a seat for one end of a closed end release spring 27 located within brake cylinder device 1. Release spring 27 concentrically encompasses piston rod 6 having its other end seated against annular piston head 12 to bias the piston rod 12 towards the forward end of the brake cylinder until the ribs on the forward portion of the packing cup 14 engage the pressure head 3 as shown in FIG. 1.

Suitably seated on the wedging surface 18 of collar 15 is an annular rubber cushion 28, which cushion 28 is generally frustoconical in shape having an outer wall surface 29 which tapers rearwardly and inwardly towards the longtudinal center line thereof for complementary engagement with the wedging surface 18. The forward annular surface of cushion 28 is planar and lies in a plane that is normal to the longitudinal center line of the central bore of annular rubber cushion 28, which central bore is of uniform diameter.

Suitably mounted within the bore 16 of the piston assemblage 5 for engagement with the annular rubber cushion 28 is a cylindrical push rod 30, which push rod 30 has a centrally apertured, arcuately formed, enlarged head portion 31 which forms an annular shoulder for seating engagement with the planar face of the rubber cushion 28 and a rearwardly, longitudinally extending stem portion 32. The outer wall surface of the stem portion 32, closely adjacent the enlarged head portion 31, frictionally engages the bore of the rubber cushion 28 such as to form a sealing engagement therebetween. Stem portion 32 is threadedly connected at its intermediate bore portion to a brake rod 33 (FIG. 6) which is suitably connected to the brake rigging on a vehicle in a manner well known in the art. The rear end portion of stem portion 32 has an annular guide plug 34 threadedly connected thereto for supporting an intermediate portion of the brake rod 33. An annular resilient anti-rattle ring 35 located on the rear end portion of stem portion 32 centers stem portion 32 relative to the hollow piston rod 6. Thus reciprocative movement of piston head 12 within the brake cylinder device 1 carries with it the hollow piston rod 6, push rod 30 and brake rod 33.

A cylindrical threaded plug member 35 threadedly engages the central threaded bore 17 of the annular piston head 12 with its one end abuttingly engaging the forward portion of the push rod 30, such that rotation of plug member 35 relative to the annular piston head 12 forces push rod 33 into sealing engagement with the rubber cushion 28 as well as forces sealing engagement between the rubber cushion 28 and the annular wedging surface 18 of piston head 12. Plug member 35 has a plurality of diametrically extending slots 36 on its other or forward end. Annular piston head 12 has a plurality of circumferentially spaced recesses 37 closely adjacent the central bore thereof located substantially in alignment with the slots 36 on the plug member 35 when plug member 35 compresses rubber cushion 28 in sealing engagement with piston head 12 and push rod 30 on rotation of plug member 35 relative to piston head 12. An elongated spring wire retainer 38 having its respective end portions located in a pair of diametrically spaced recesses 37 and the slot 36 on plug member 35 coplanar therewith prevents relative rotation between plug member 35 and piston head 12 to thereby rigidly connect the piston assemblage 5 into an integral unit. Packing cup 14 located on the piston head 12 assures that spring wire retainer 38 is maintained in position.

Cylindrical plug member 35 has a pair of spaced bores 39 extending from the forward surface thereof longitudinally inwardly into the body thereof. Bores 39 are on opposite sides of the longitudinal center line of plug member 35, having axes that are parallel to the longitudinal center line as well as coplanar therewith. The bores 39 are adapted to be engaged by a spanner wrench so that upon rotation thereof the plug member 35 can be unthreaded from the piston head 12 to facilitate disassembly of the brake cylinder device 1.

Figure 2:
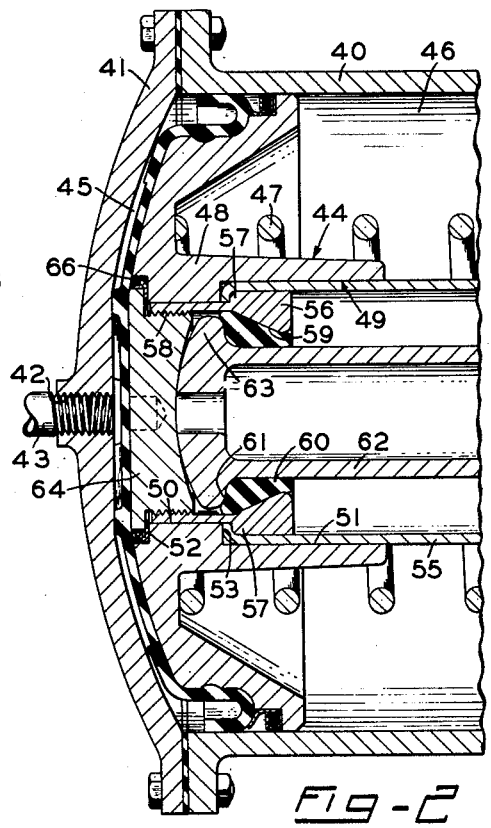
FIG. 2 is a modification of the piston rod and head assembly showing a side elevational, cross-sectional view of a forward portion of the brake cylinder piston assembly with the piston rod and piston head located in the forward portion of the brake cylinder.

FIG. 2, a modification of the brake cylinder device 1 shown in FIG. 1, comprises a hollow cylindrical body 40, having a forwardly disposed pressure head 41 suitably secured thereto and a rearwardly disposed non-pressure head (not shown) defining a brake cylinder similar to the structure described in FIG. 1. Pressure head 41 has a central threaded aperture 42 which threadedly receives a conduit 43 which is suitably connected to a pressure source and a control valve of the usual air brake system, whereby pressurized fluid is adapted to be conducted to the brake cylinder device.

Suitably reciprocably mounted within the cylindrical body 40 is a piston assemblage 44 which forms at one side thereof a pressure chamber 45 as defined by the forward portion of the piston assemblage 44, the inner wall surface of the pressure head 41 and the cylindrical body 40, and which forms at the other side thereof a non-pressure chamber 46 as defined by the other side of the piston assemblage 44, the inner wall surface of the cylindrical body 40 and the non-pressure head (not shown). A closed-end helical spring 47 suitably mounted within the cylindrical body 40 has one end seated on the non-pressure head and the other end abuttingly engaging the piston assemblage 44 to bias the piston assemblage 44 into the forwardmost position within the cylindrical body 40 as shown in FIG. 2. Spring 47 returns the piston assemblage 44 into its inoperative or non-braking position whenever the pressure within the pressure chamber 45 is relieved of pressure by suitable valve means (not shown) to effect a release of the braking operation.

Piston assemblage 44 comprises a centrally apertured annular piston head 48 whose central bore 49 has a forwardly disposed enlarged diameter bore portion, an intermediate reduced bore portion 50 and rearwardly disposed enlarged bore portion 51. Annular piston head 48 thus presents an annular forwardly facing shoulder 52 between the enlarged diameter bore portion and the intermediate reduced bore portion 50 and presents a rearwardly facing annular shoulder 53 between the intermediate reduced bore portion 50 and the enlarged bore portion 51. Annular piston head 48 has a recess or slot 54 (FIG. 4) extending radially outwardly from the forwardly disposed enlarged diameter bore portion of central bore 49 for a purpose to be described.

A hollow piston rod 55, having an inwardly extending flanged portion seated on the rearwardly facing shoulder 53, is suitably frictionally retained within the rearwardly extending enlarged bore portion 51.

A tubular push rod keeper 56 is suitably mounted in the central aperture of the annular piston head 48, with the forward end outer wall surface thereof abuttingly engaging the inner wall surface of the intermediate bore portion 50 of the piston head 48. The outer end wall surface of the rear end portion of keeper 56 abuttingly engages the inner wall surface of the hollow piston rod 55 such that a shoulder 57, intermediate the forward and rear end portion of the tubular push rod keeper 56, abuttingly engages the forward flanged portion of the hollow piston rod 55. The forward bore portion of tubular push rod keeper 56 is suitably threaded as at 58 for a purpose to be described. The rear end portion of the tubular push rod keeper 56 has a rearwardly and inwardly tapering portion which presents an annular wedge surface 59 such that a cross-sectional view of the tubular push rod keeper presents a pair of converging side surfaces.

Suitably seated in abutting engagement with wedge surface 59 of rod keeper 56 is an annular rubber cushion 60, which rubber cushion 60 is generally frustoconical in shape. Rubber cushion 60 has a central bore of substantially uniform diameter and a forward annular planar surface 61 that is normal to the longitudinal center line thereof. The outer side surface of rubber cushion 60 tapers downwardly, rearwardly and inwardly for complementary engagement with the wedge surface 59 of the tubular push rod keeper 56.

Suitably mounted within the bore of the annular rubber cushion 60 is a hollow push rod 62 whose forwardmost end portion has an arcuately formed enlarged end portion 63 which forms an annular shoulder for abutting engagement with the forward annular planar surface 61 of the rubber cushion 60.

Although the modified structure of FIG. 2 does not disclose the relationship of the rearward portions of the push rod 62, the push rod 55 and the cylindrical body 40, it is to be understood that the structure is similar in all respects to the structure of FIG. 1.

A threaded cylindrical plug member 64 having a forwardly disposed enlarged cylindrical portion or flange and a rearwardly disposed reduced threaded cylindrical portion is threadedly engaged with the threaded bore 58 of the push rod keeper 56 with the enlarged cylindrical portion or flange of the plug 64 abuttingly engaged with forwardly facing shoulder 52 on piston head 48, such that the inward movement of the cylindrical plug member 64 relative to the stationary tubular push rod keeper 56 causes the cylindrical plug member 64 to force the hollow push rod 62 inwardly to wedgingly engage the rubber cushion 60 and cause a sealing engagement between the hollow push rod 62, the tubular push rod keeper 56 and the annular rubber cushion 60 respectively. Complete inward movement of the plug member 64, acting through the cooperative relationship of the shoulder 57 on keeper 56 and the forwardly disposed flange on the piston rod 55, draws said piston rod flange tightly against the shoulder 53 of the piston head 48 to secure said piston rod relatively to the piston head.

Figure 4:
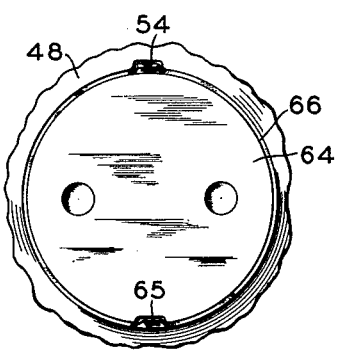
FIG. 4 is a plan view of the plug and a portion of the piston head showing a modified locking means.
Figure 5:
FIG. 5 is a side elevational, cross-sectional view of a soft steel washer as shown in FIG. 4.

Cylindrical plug 64 has a recess 65 (FIG. 4) extending from the outer periphery thereof, radially inwardly for a short distance. Mounted between cylindrical plug member 64 and the shoulder 52 of the annular piston head 48 is a soft steel washer 66 which is adapted to have its diametrical end portions deformed into recess 54 and the recess 65 on the annular piston head 48 and the cylindrical plug member 64, respectively, as shown in FIG. 4 to lock the respective cylindrical plug member 64 to the annular piston head 48 to prevent relative movement therebetween.

Figure 3:
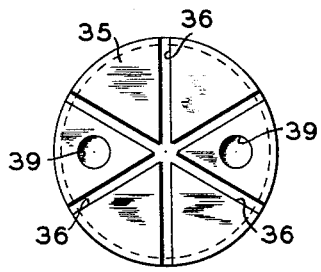
FIG. 3 is a plan view of the plug shown in FIG. 1 showing the lock wire slots in the top surface of the plug.

To assemble the fluid brake cylinder device 1, the rubber cushion 28 is slid over the push rod 32 up against the enlarged head portion 31. The push rod 32 with the cushion 28 thereon is inserted into the stepped bore 16 of the piston head 12 until the tapering outer wall surface 29 of rubber cushion 28 abuttingly engages the annular wedging surface 18 of the piston head 12. The plug member 35 is then screw threaded into the threaded bore 17 of piston head 12 and tightened by a spanner wrench until the plug member 35 is flush with the forward face of annular piston head 12 at which time the enlarged head portion 31 of push rod 30 compresses the rubber cushion 28 into sealing engagement with the wedging surface 18 of the piston head 12. Thereafter, either of the above-disclosed locking means of FIGS. 3 or 4 is used to lock the plug member 35 to the piston head 12 to prevent relative movement therebetween and provide an integral piston assemblage. The manner of assembling the piston assemblage 44 is substantially similar to the abovedescribed operation as disclosed by FIG. 1.

Obviously, modifications and variations of the present invention are possible in the light of the above teachings. It is therefore to be understood that within the scope of the appended claim, the invention may be practiced otherwise than is specifically described.

Having now described the invention, what I claim as new and desire to secure by Letters Patent, is:

A piston assembly for reciprocable mounting in a brake cylinder comprising:
  (a) a piston member having a forward enlarged radially extending piston head portion and a rearwardly extending tubular portion,
  (b) said piston member having a coaxial bore extending therethrough and an annular forwardly facing shoulder surrounding the opening of said bore at the end adjacent the piston head portion, and said tubular portion having a rearwardly facing radial shoulder formed in said coaxial bore,
  (c) a hollow piston rod closely fitting in the rearward portion of said coaxial bore and having an inwardly extending flange at one end abuttingly engaging said shoulder,
  (d) a tubular push rod keeper having an internally threaded forward portion slidably supported exterally within the forward portion of said coaxial bore and having a rearward portion within which is a conical bore tapering rearwardly,
  (e) said keeper having an outer annular shoulder thereon engaging the said flange on the end of said hollow piston rod,
  (f) sealing means having an annular tapering portion conforming to and disposed within said conical bore of said keeper,
  (g) a push rod having a flanged forward end portion engaging said sealing means forwardly thereof, and
  (h) a plug member having a forwardly disposed flange and a rearwardly disposed externally threaded portion which, when screwed into said threaded forward portion of said push rod keeper, abuttingly engages the flanged forward end portion of said push rod to cause relative movement between the push rod and the push rod keeper to lock said push rod within said keeper and resulting in wedging the sealing means in sealing relation between said push rod and said push rod keeper, said plug member also being effective when screwed into said threaded portion of said push rod keeper and upon abutting engagement of said forwardly disposed flange on the plug member with the forwardly facing shoulder on the piston member, for causing the inwardly extending flange on said piston rod to be clamped between the outer annular shoulder on said keeper and the said rearwardly facing radial shoulder in the coaxial bore in the tubular portion of said piston member.

References Cited in the file of this patent

UNITED STATES PATENTS

| | | |
|---|---|---|
| Re. 19,904 | Donaldson | Mar. 31, 1936 |
| 1,201,464 | Hebert | Oct. 17, 1916 |
| 1,208,350 | Moore | Dec. 12, 1916 |
| 1,784,026 | Olson | Dec. 9, 1930 |
| 1,871,684 | Gibbons | Aug. 16, 1932 |
| 2,089,491 | Kuiper | Aug. 10, 1937 |
| 2,277,124 | Maliphant et al. | Mar. 24, 1942 |
| 2,297,649 | Donaldson | Sept. 29, 1942 |
| 2,778,664 | Herbenar | Jan. 22, 1957 |
| 2,875,864 | Kirk | Mar. 3, 1959 |
| 2,880,025 | Herbenar et al. | Mar. 31, 1959 |
| 3,089,717 | Gair | May 14, 1963 |